US007006522B1

(12) United States Patent
Wang et al.

(10) Patent No.: US 7,006,522 B1
(45) Date of Patent: Feb. 28, 2006

(54) SYSTEM AND METHOD FOR ALERT GENERATION USING NETWORK INTERFACE

(75) Inventors: Chi-Lie Wang, Sunnyvale, CA (US); Baodong Hu, Milpitas, CA (US); Nathan Henderson, San Jose, CA (US)

(73) Assignee: 3Com Corporation, Marlborough, MA (US)

( * ) Notice: Subject to any disclaimer, the term of this patent is extended or adjusted under 35 U.S.C. 154(b) by 933 days.

(21) Appl. No.: 09/796,063

(22) Filed: Feb. 28, 2001

(51) Int. Cl.
*H04L 12/66* (2006.01)
(52) U.S. Cl. ...................... 370/463; 370/501; 713/300
(58) Field of Classification Search ............... 370/463, 370/501, 502; 709/250; 710/52; 713/300, 713/310, 340
See application file for complete search history.

(56) References Cited

U.S. PATENT DOCUMENTS

| | | | | |
|---|---|---|---|---|
| 6,189,108 | B1 * | 2/2001 | Cromer et al. | 713/340 |
| 6,249,812 | B1 * | 6/2001 | Cromer et al. | 709/221 |
| 6,266,696 | B1 * | 7/2001 | Cromer et al. | 709/224 |
| 6,292,831 | B1 * | 9/2001 | Cheng | 709/224 |
| 6,298,449 | B1 * | 10/2001 | Carter | 713/340 |
| 6,532,497 | B1 * | 3/2003 | Cromer et al. | 709/250 |
| 6,760,781 | B1 * | 7/2004 | Wang et al. | 709/250 |

OTHER PUBLICATIONS

System Management Bus (SMBus) Specification, Version 2.0, Aug. 3, 2000, SBS Implementers Form, pp. 1-59.
Excerpt of Oct. 8, 1998 Adapter Operation Specification, 3Com Corporation, Total of 5 pages.

* cited by examiner

*Primary Examiner*—Dang Ton
*Assistant Examiner*—Robert C. Scheibel, Jr.
(74) *Attorney, Agent, or Firm*—Mark A. Haynes; Haynes Beffel & Wolfeld LLP

(57) ABSTRACT

A system which provides for generation of alert packets using network interfaces. The alert packets are downloaded into a network interface, for example during a transition from an OS-present state to an OS-absent state. The alert packets are provided with control fields which, in various combinations, indicate alert conditions upon which such packets are to be transmitted, and which indicate a repetition mode for transmission of the packet after a match of the alert condition. Logic in the network interface, causes scanning in the plurality of packets downloaded into the network interface at scan intervals to identify packets having control codes matching alert signals received by the network interface. The process allows for more than one alert packet to be matched with a single alert signal during a given scan interval, and to be transmitted. Also, in one embodiment, each alert packet which matches an alert signal can be transmitted according to a repetition mode indicated in the control fields of the packet.

19 Claims, 7 Drawing Sheets

SYSTEM AND METHOD FOR ALERT GENERATION USING NETWORK INTERFACE

BACKGROUND OF THE INVENTION

1. Field of the Invention

The present invention relates to computer networks and to interface devices for connecting host computers to networks. More particularly, the present invention relates to alert messages sent for system management support by network interface cards in network connected systems.

2. Description of Related Art

Computer systems include network interfaces that support high speed data transfer between the host computer and the data network. Often, such computer systems include system management resources to monitor system and power management events, and generate alert signals upon certain types of events. The alert signals are used by management logic in the system in a wide variety of ways, to improve reliability and performance of the system.

Many computer systems include power management logic which puts the system to sleep, or in a low power mode, in response to activity in the system. When the system is asleep, for example, the operating system (OS) ceases operation. To bring the system awake, the operating system must be reloaded, such as through a boot sequence. When the operating system is inactive, the power consumed by the system is reduced. Such systems can be said to have an OS-present state, and an OS-absent state. Protocols have been developed by which remote management systems can wake up a system in an OS-absent state, by sending special wake up packets which the network interface is adapted to recognize without host assistance.

Increasingly, remote management systems are used which communicate over data networks. When alerts occur, network packets are produced and forwarded to the remote management station. In the prior art, packet transmission in support of system and power management systems has been conducted under the control of the operating system. Thus, in a sleep mode, or other OS-absent mode, the remote management systems have not been able to receive timely notifications of alert conditions.

These network interfaces are typically based on a first-in-first-out (FIFO) buffer. Thus, packets coming onto the network interface, either from the network or from the host computer are stored in the FIFO. The first packet into the FIFO is transmitted out first in order to maintain sequential data transfers. The FIFO structure is an efficient, high throughput system for managing high speed network interfaces such as Gigabit Ethernet interfaces.

One prior art network interface, has been constructed so that in an OS-absent mode, the network interface is able to transmit keep alive messages to remote management systems on the network. The keep alive messages are loaded into the FIFO buffer of the network interface chip in connection with a transition to an OS-absent state. Logic in the network interface chip remains operational during this state to transmit the keep alive messages. The keep alive messages may be configured in this prior art device to be transmitted periodically in response to an interval timer, and in response to wake up packets from a remote management station. The keep alive messages may also be configured to be transmitted only when a control code in a packet header matches a signal received on one of the I/O pins on the network interface chip. This allows a system configuration where an external event, such as fan speed, over-temperature, or over-voltage can cause assertion of an event signal on one of these pins, and cause transmission of an alert packet on the network.

Alerts in connection with system and power management events are diverse. The approach of the prior art network interface is relatively inflexible, and difficult to integrate with standard systems, such as the SMBus, used for monitoring and communicating signals about system and power management events. (See, *System Management Bus (SMBus) Specification, Version* 2.0, SBS Implementers Forum, Aug. 3, 2000.) It is desirable therefore, to provide for more flexible and efficient system for alert packet transmission, operable during an OS-absent mode.

SUMMARY OF THE INVENTION

The present invention provides improved manageability and flexibility for the generation of alert packets using network interfaces. The alert packets are downloaded into a network interface, for example during a transition from an OS-present state to an OS-absent state. The alert packets are provided with control fields which, in various combinations, indicate alert conditions upon which such packets are to be transmitted, and which indicate a repetition mode for transmission of the packet after a match of the alert condition. Logic in the network interface, causes scanning of the plurality of packets downloaded into the network interface at scan intervals to identify packets having control codes matching alert signals received by the network interface. The process allows for more than one alert packet to be matched with a single alert signal during a given scan interval, and to be transmitted. Also, in one embodiment each alert packet which matches an alert signal can be transmitted according to a repetition mode indicated in the control fields of the packet.

In one embodiment, the process provides for indicating an alert edge upon receipt of an alert signal, and indicating an alert level signaling whether an alert signal is being asserted or not. The process of transmitting the alert packets according to a repetition mode, is also responsive to the alert edge and the alert level. Thus, in one repetition mode, the alert packet is transmitted for a repetition count number of times, such as one or three times, as indicated by the control fields in a frame header, upon an alert edge match. In another repetition mode, the alert packet is transmitted at intervals an indefinite number of times during the assertion of an alert level, until the alert level signal is cleared.

According to another embodiment of the invention, a data processing system is provided, comprising a host processor, a network interface, and the system management system. The system management system issues alert signals in response to events, such as fan speed levels, temperature, voltage levels, and the like, related to system and power management. The network interface includes memory, such a transmit packet buffer, storing a plurality packets to be transmitted by the network interface. Logic in the network interface is responsive to the alert signals to scan the plurality of packets stored in the memory at scan intervals, and transmits multiple different packets in the plurality of packets which include control codes matching a single alert signal during a given scan interval.

In one embodiment, the system management system includes a system management bus, like a special purpose serial bus, coupled with the network interface. In this embodiment, the alert signals comprise data transmitted over the system management bus. In another embodiment, the network interface is arranged to accept alert signals from either a system management bus, or from special purpose I/O pins on the network interface chip.

In another embodiment, the host processor includes logic which downloads a plurality of alert packets, including the control fields mentioned above, into the memory of the network interface, the connection with a transition from an OS-present state to an OS-absent state. Further, the host processor in one embodiment includes logic which operates during an OS-present state to scan an alert register in the network interface, and to respond to alert conditions indicated in the alert register by causing transmission of alert packets.

According to another embodiment, a data processing system is provided comprising a host processor, a network interface and a system management system as described above. In this embodiment, the network interface includes logic that is responsive to alert signals to scan the plurality of packets stored in the memory at scan intervals, and to transmit packets in the plurality of packets which include control codes matching an alert signal during a particular scan interval. In this embodiment, at least one particular packet in the plurality of packets includes a control code indicating a repetition number for the particular packets, and the logic is responsive to the repetition number to transmit the particular packet the repetition number of times in response to a match during the particular scan interval.

According to the present invention, alert messages can be sent out to indicate system failure from a local personal computer (PC) to a remote system management console upon detecting any abnormal condition in both OS-present and OS-absent states. This allows a remote management system to access and control the local PC in both OS-present and OS-absent states. System manageability can be improved to minimize maintenance and maximize system availability.

Other aspects and advantages of the present invention can be seen upon review of the figures, the detailed description, and the claims which follow.

DETAILED DESCRIPTION

A detailed description of embodiments of the present invention is provided with respect FIGS. 1–8.

Figure 1:
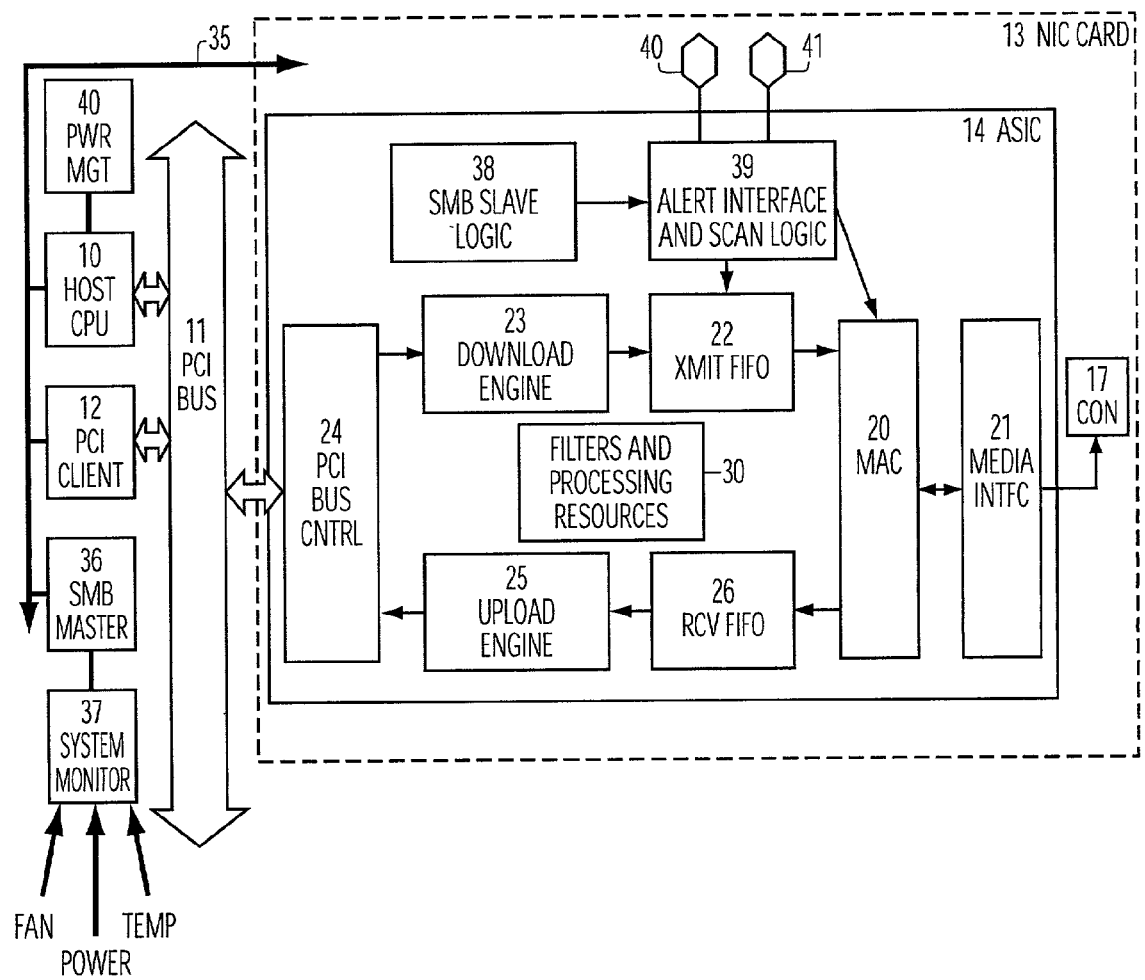
FIG. 1 is a simplified block diagram of a data processing system including a network interface supporting alert packet transmission according to the present invention.

FIG. 1 provides a basic diagram of a computer system having a host CPU 10 coupled to a bus system 11, such as a PCI bus. The bus 11 interconnects a plurality of PCI clients, including client 12 and the network interface card 13 shown with expanded functional blocks. The network interface card 13 includes an application specific integrated circuit ASIC 14. The ASIC 14 includes network interface functions for an Ethernet interface (in Gigabit, 100 Mbit or 10 Mbit formats for example) in this embodiment. Other embodiments provide interfaces to other types of the network media. In addition to the ASIC 14, other components are interconnected by and supported by the circuit board of the network interface card 13. For example, a BIOS ROM (not shown), an EEPROM (not shown) and a medium connector 17 are on the circuit board. The network interface may also be implemented on a motherboard or other mounting arrangement. Also, the integrated circuit may be a system-on-a-chip device including the network interface logic.

The data processing system also includes a system management bus 35 is coupled to the various components, including a host CPU 10, the PCI client 12, and the network interface chip 14. A system management bus master circuit 36 is included which manages the transmission messages on the system management bus 35. The system management system includes a system monitor, generically represented by block 37, which monitors events relevant to system and power management. For example, the system monitor 37 monitors fan speed, power consumption, temperature, battery level, and the like. Upon certain events indicated by the monitored characteristics of the system, alert signals are issued on the system management bus 35. Power management logic 40 is included to signal the host to enter a sleep mode, or other state in which the operating system is inactive, or in a reduced activity mode.

In the illustrated embodiment, the system management bus comprises a bus complaint with a standard system management bus (SMBus) specification. Each of the components coupled with the system management bus, includes a system management bus slave logic block. Thus, the network interface chip 14 includes SMB slave logic 38 which is coupled to the system management bus 35.

According to the present invention, the network interface chip 14 also includes an alert interface and alert scan logic block 39. The alert interface and alert scan logic block 39 is coupled to special purpose I/O pins 40, 41 at which alert signals may be received from the circuitry on the card 13, as issued by system management resources. Also, the alert interface and scan logic block 39 is coupled to the SMB slave logic 38 in a preferred embodiment, for receiving alert signals. In one embodiment, the alert interface and alert scan logic block 39 includes an alert register accessible via the host bus interface 24, so that the host may utilize the alert interface during an OS-present state for example.

The ASIC 14 includes a medium access controller (MAC) 20 coupled to media interface circuitry 21 connecting to the connector 17. The medium access controller 20 is also coupled to a transmit FIFO buffer 22 which is driven by a download engine 23 on the ASIC 14. The download engine 23 is coupled to a PCI bus controller 24. The PCI bus controller 24 is also coupled to an upload engine 25. The upload engine 25 is coupled to a receive FIFO 26 which is connected to the medium access controller 20. Thus, the illustration of the ASIC 14 includes basic elements of a network interface controller chip.

In addition, the ASIC 14 includes resources 30 coupled to FIFO structures 22 and 26, and to the upload and download engines, for managing the transferring of packets into and out of the buffers.

The network interface is used to connect to the network and provide communication paths to pass messages to remote systems. The network interface operates in an OS-present state normally through the host bus 11. On the transmit side, the packets can be downloaded through host bus to the transmit packet buffer 22. The packets are forwarded to the Media Access Controller (MAC) 20, which converts the packets to conform with the IEEE 802.3 Data Link layer protocol. These packets will finally go through the Physical Layer Interface 21 and be transmitted onto the wire (or other type of media, including wireless media) via an connector 17. On the receive side, the packets being received from the wire will go through the physical layer interface 21 and the MAC 20 before getting written into receive packet buffer 26. These packets will then be uploaded through host bus to host memory. The host bus interface 24 on the NIC 13 in this example consists of PCI slave and PCI master. The function of the PCI slave is to determine whether to accept a transaction initiated from the PCI Host. This transaction will be used to initialize NICs' registers, check status, handle interrupts and control data movement. The function of the PCI master is to download the packets to be transmitted and upload the packets being received through the PCI Bus. Each packet consists of multiple fragments and each fragment can be located in different chunks of host memory. Data downloading starts with fetching the address and the length information of each fragment, followed by downloading the packet data from host memory to the transmit buffer 22. This process repeats until all the fragments within a packet and all the packets are downloaded. Data uploading is handled the same way as data downloading except the direction of the data is reversed, with data flowing through the receive buffer 26 to the host bus 11.

According to the present invention, alert packets are downloaded to the transmit buffer in connection with a transition of the host processor to a sleep state, or other OS-absent state. Before the sleep state is entered, a plurality of alert packets are downloaded to the network interface. The plurality of alert packets comprise a set of alert packets composed to match the network and system environment of the data processing system. Thus, multiple alert packets destined for example to different management stations, or different management processes within a single station, can be downloaded, which will be transmitted in response to a single alert signal. Also, alert packets can be configured with individual repetition modes as described above, which suits the function to be achieved by the alert packets, in order to improve system performance and reliability.

Figure 2:
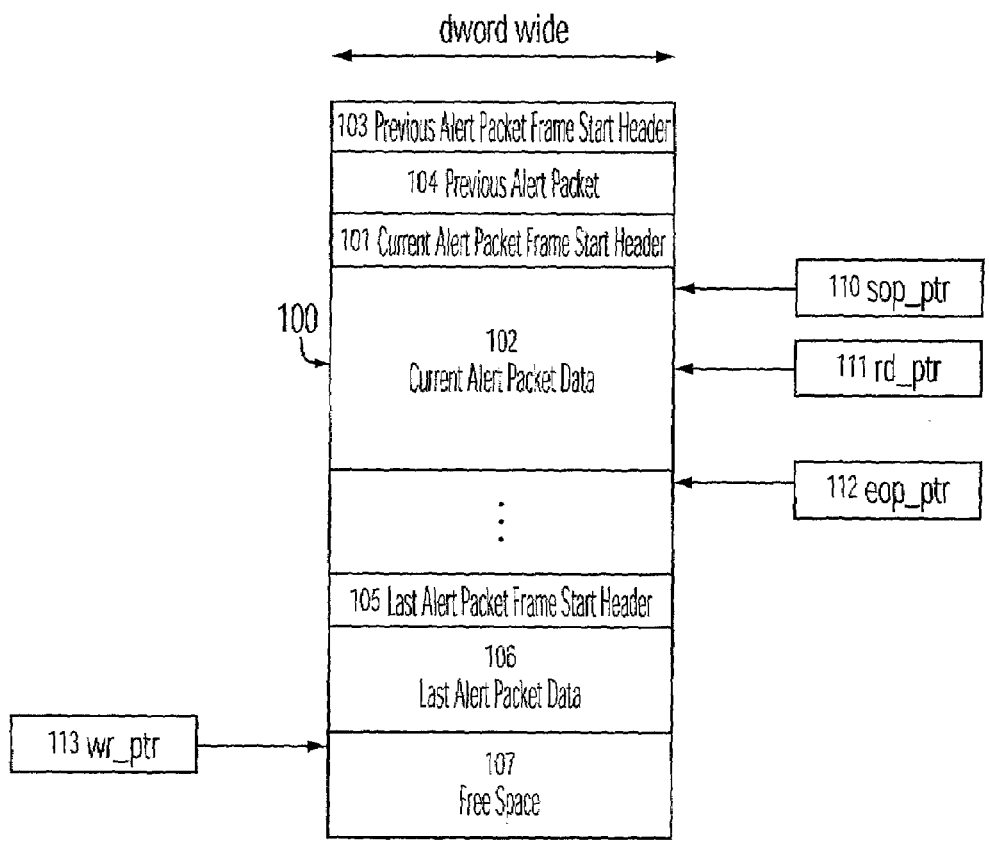
FIG. 2 illustrates in the structure used in the FIFO based transmit packet buffer in the system of FIG. 1.

FIG. 2 shows the layout of an example transmit packet buffer 100 for implementation in a transmit FIFO as described with respect to FIG. 1. The transmit packet buffer 100 is used to store multiple alert packets. These packets can be downloaded from the host bus. If the OS is present, after a driver detects an alert condition by reading out the alert register in the network interface chip, the corresponding alert packet will be downloaded into the transmit packet buffer 100 and sent out accordingly. For the OS-absent state, the host driver downloads all alert packets before the system goes to sleep. The scan control logic will be activated to send out alert packets upon detecting corresponding alert conditions.

FIG. 2 shows the organization in the transmit buffer 100. The diagram illustrates a current alert packet, including a current alert packet frame start header 101, and a current alert packet data field 102. Multiple alert packets are stored in the buffer. Thus, the previous alert packet includes a previous alert packet frame start header 103, and the previous alert packet data 104. In addition, a last alert packet includes a last alert packet frame start header 105, and last alert packet data 106. The balance of the space in the buffer is free space during the operating system absent mode. In this example, the width of the transmit buffer 100 is a double word, or 32 bits. Other transmit buffer widths may be utilized as well.

In a preferred embodiment, the alert packets are organized in the transmit buffer as a linked list, with each alert packet including a pointer to the end of the packet where the next packet will be encountered, and an indication of whether it is the last packet in the list.

Access to the data in the transmit buffer 100 is controlled by a set of pointers. This example, there is a start of packet pointer 110, a read pointer 111, an end of packet pointer 112, and a write pointer 113. The use of these pointers is typical of network interface chips known in the art.

Figure 3:
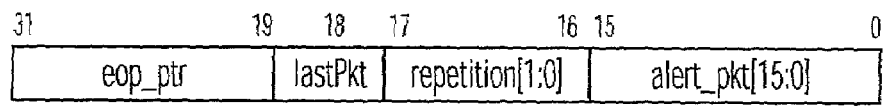
FIG. 3 shows a format for a frame start header of an alert packet according, to one embodiment of the present invention.

Each packet will have a frame start header (FSH) or other control field, which is used to store control information for sending out alert messages. FIG. 3 shows one example format for a frame start header according to the present invention.

bit[15:0]: alert_pkt. each bit corresponds to one external alert event. The alert packet associated with the FSH will be sent out if there is a match found during scan.

bit[17:16]: repetition. 00—NA; 01—send out once on alert edge; 11—send out three times on alert edge; 10-send out indefinately on alert level bit[18]: lastPkt. indicates the last alert packet in the linked list.

bit[31:19]: end of packet pointer(eop_ptr). This pointer is stored into FSH after the final data of the packet is written into the transmit buffer. While reading an alert packet from transmit buffer, the read pointer reaches the value here, indicating the current alert packet read is completed.

Figure 4:
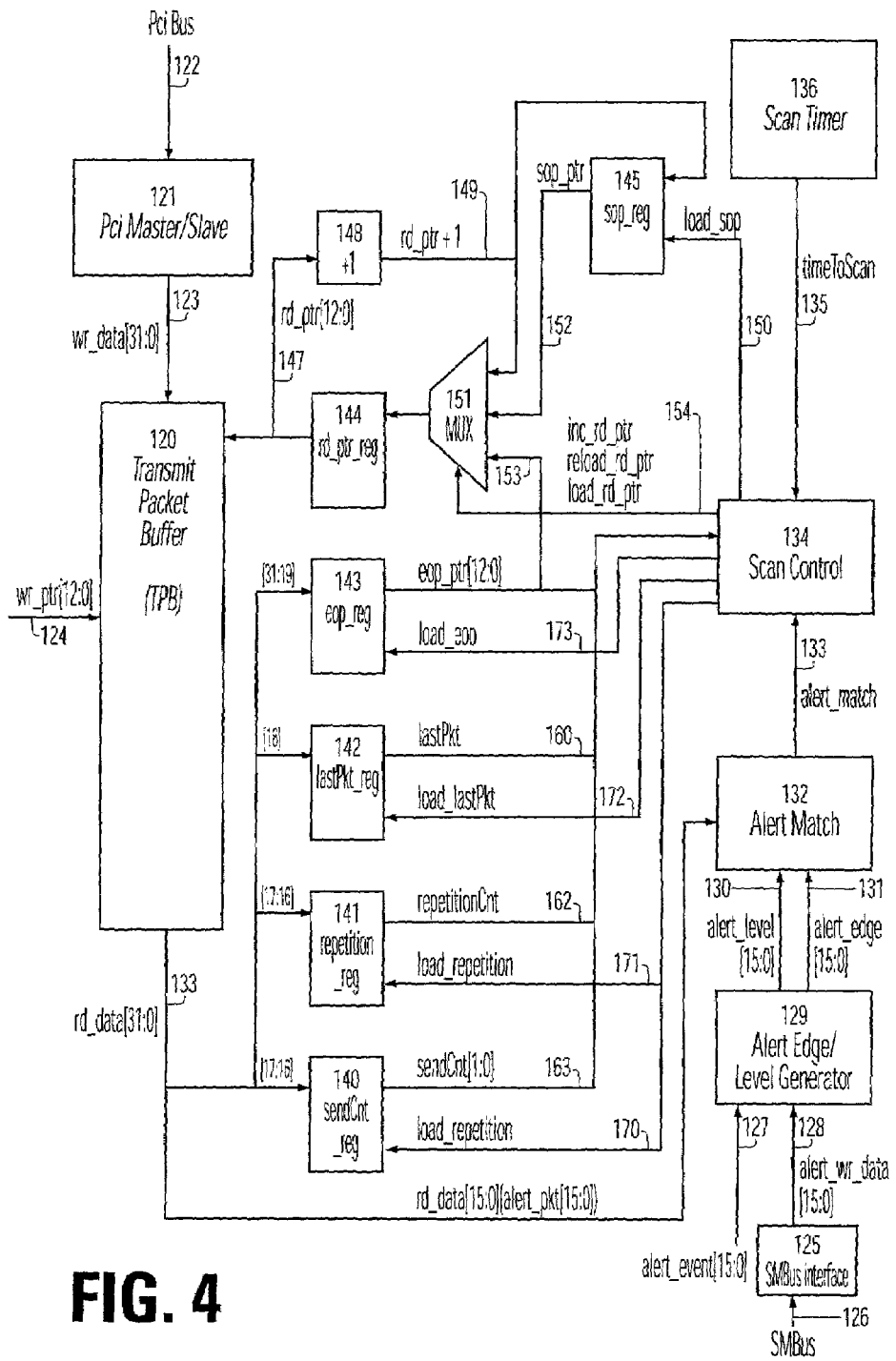
FIG. 4 is a diagram illustrating the alert signal interface and scan logic for one embodiment of the network interface in the system of FIG. 1.

FIG. 4 is a logical block diagram of resources in the network interface chip 14 of FIG. 1 used for generation of alert messages according to the present invention. If resources include transmit packet buffer 120, and a PCI master/slave interface 121. The PCI master/slave interface 121 is coupled to the PCI bus 122. A write data bus 123 writes a double word in parallel to the transmit packet buffer 120 during download of packet. A write pointer 124 is used to control of the location in the transmit packet buffer at which a word on the bus 123 is stored. A system management bus interface 125 is coupled to a system management bus 126. Also inputs are provided on alert event signal pins 127. In this example, there are 16 alert event pins 127, and a register in the SM bus interface 125 provides a 16-bit alert write data value. The 16 alert event pins 127 and the 16-bit alert write data value on line 128 from the SM bus interface 125 for supply to alert edge/level generator 129. The alert edge/level generator 129 produces an alert level signal on line 130 and an alert edge signal on line 131, each comprising 16-bits which correspond respectively to 16 separate alert signals. The alert level signal on line 130 and the alert edge signal on line 131 are supplied to alert match logic 132. The alert match logic 132 receives as input the alert packet field from the read data bus 133 which is coupled to the output of the transmit packet buffer 120. The alert match logic 132 supplies an alert match signal on line 133 to a scan control logic block 134. The scan control logic block 134 also receives a time to scan signal on line 135 from a scan timer 136.

The scan control logic 134 controls the loading of a plurality of registers, and accepts data from the plurality of registers in support of the scanning of packet headers in the transmit packet buffer. Thus, the logic includes a send count register 140, a repetition register 141, a last packet register 142, and an end of packet register 143. In addition, the logic includes a read pointer register 144 and a start of packet register 145.

The send count register 140 and repetition register 141 are coupled to bits 17:16 of the read data bus 133. The last packet register 142 is coupled to bit 18 of the read data bus 133. The end of packet register 143 is coupled to bits 31:19 of the read data bus 133. The registers 140-143 have outputs coupled to the scan control logic 134, and are loaded in response to control signals on lines 170 to 173, including a load repetition signal on line 170, a load repetition signal on line 171 (same signal has supplied on line 170), a load last packet signal on line 172, and a load end of packet signal on line 173, respectively.

The output of the end of packet register 143 is a 13 bit end of packet pointer on line 153. The output of the last packet register 142 is a last packet signal on line 160. The output of the repetition register 141 is a two bit repetition count signal on line 162. The output of the send count register 140 is a two bit send count signal on line 163.

The read pointer register 144 supplies a read pointer to the transmit packet buffer 120 for use during the scan process. The input to the read pointer register 144 is provided through logic including an incrementer 148, which receives the read pointer on line 147 as input, and supplies an incremented read pointer on line 149 as output. The logic also includes the start of packet register 145 which receives as input the end of packet pointer on line 149. The start of packet register 145 is loaded in response to a load start of packet signal on line 150 from the scan control logic. The logic for supplying the read pointer also includes multiplexer 151. The inputs to the multiplexer 151 include the incremented read pointer on line 149, the start of packet pointer on line 152 from the start of packet register 145, and the end of packet pointer on line 153 from the end of packet register 143. The multiplexer 151 is controlled by the scan control logic 134 across line 154, for selecting the incremented read pointer from line 149, to cause loading of the read pointer from the start of packet register 145, or to load the read pointer from the end of packet register on line 153.

In OS-absent state, system is in sleep mode. Alert packets should be downloaded into transmit packet buffer 120, in connection with system power down, or other entry into a state in which the OS appears absent from the point of view of the network interface. The scan timer 136 is activated once every second (or other appropriate scan interval) to scan all the alert packets in buffer 120. If there is a match found between external alert event and the alert packets in buffer 120 (indicated by alert_pkt bits in the frame start header), the corresponding alert packet will be sent out on the network, for example destined to a remote system management console. Otherwise, the current alert packet will be skipped and the scan logic will move to the next alert packet in the buffer 120. The above steps will repeat until all the alert packets in the buffer 120 have been scanned within one scan interval.

The scan timer 136 is used to enable scan logic 134 to start scanning the alert packets in the buffer 120. A timeToScan signal is asserted on line 135 once every second. All the alert packets in buffer 120 should be scanned and compared with external alert event to determine whether they should be sent out or skipped.

Scan control logic 134 is used to scan each alert packet stored in buffer 120, and compare control data in the frame start header with external alert events. If there is a match found, the corresponding alert packet will be sent out. Otherwise, it will be skipped. This process will repeat until all the alert packets in the buffer 120 are scanned.

Figure 5:
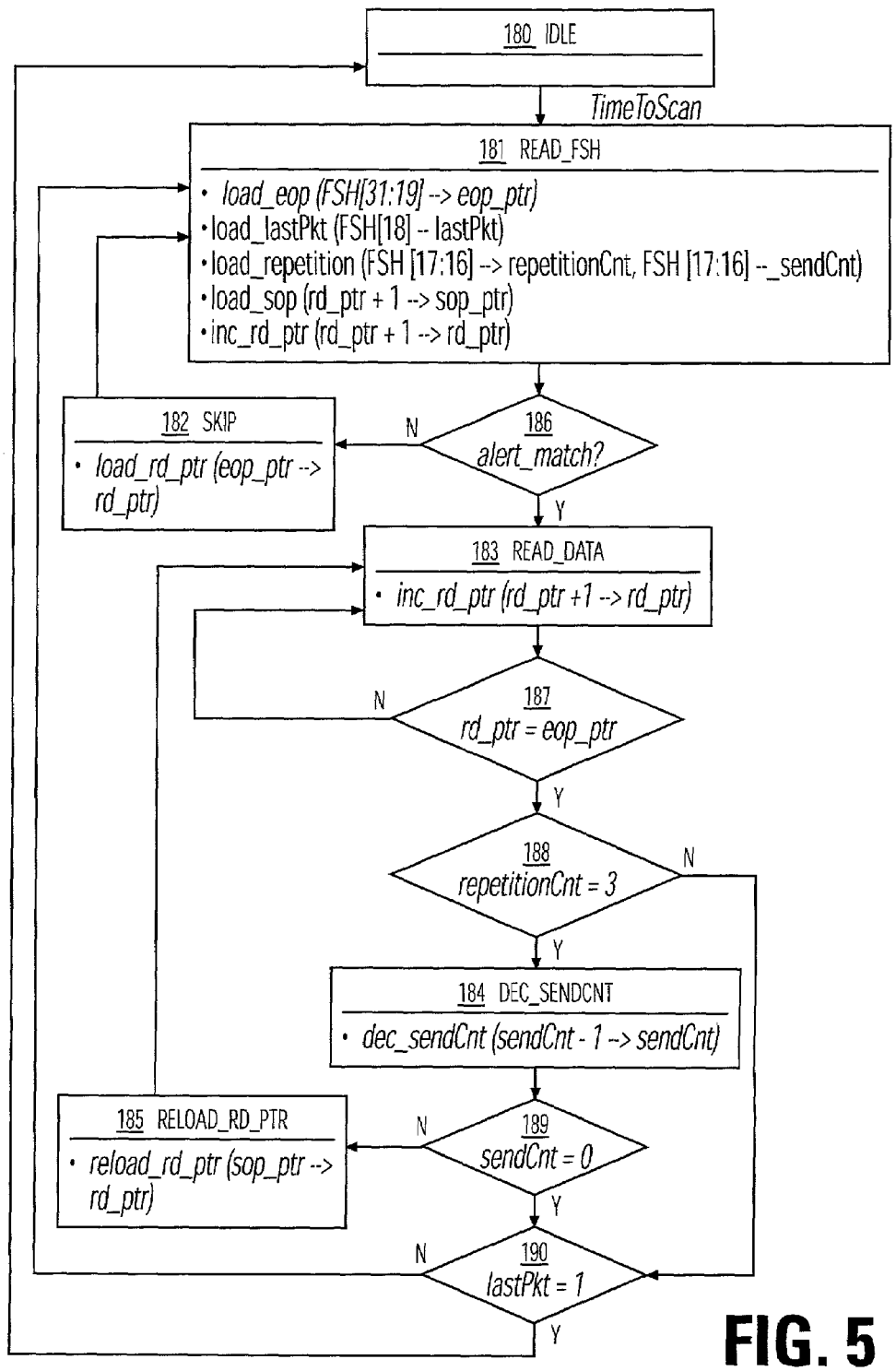
FIG. 5 is a flow diagram for scan control logic in the logic of FIG. 4.

FIG. 5 is a flow chart showing operation of the scan control process. It includes an idle state 180, a read frame start header FSH state 181, a skip state 182, a read data state 183, a decrement send count state 184 and a reload read pointer state 185.

Upon detecting timeToScan signal, scan control logic 134 will be activated, moving from the idle state 180 to the read FSH state 181. Each packet's frame start header will be read out from buffer 120. End of packet pointer (eop_ptr[12:0]) will be stored into eop_ptr_reg 143 which will be used to identify the end of the current packet. The last packet indication will be stored into lastPkt_reg 142 which will be used to indicate the last alert packet in buffer 120. Repetition count will be stored into both the repetition_reg 141 and sendCnt_reg 140. This information can be used to determine the repetition mode for the corresponding alert packet, that is whether it should be sent out one time or three times response to an alert edge, or indefinitely in response to an alert level. Start of packet pointer (sop_ptr[12:0]) should be stored into sop_reg 145 (from rd_ptr[12:0]+1) which will be used to repeatedly retransmit the same alert packet.

Alert match data alert_pkt[15:0] from the frame start header will be compared with external alert_event[15:0] (within the alert match block 132) to determine whether the alert packet which follows frame start header should be transmitted out or skipped (block 186). If there is a match found, the process moves to the read data state 183, and the alert packet will be sent out. If there is no match, the process goes to the skip state 182, and the packet will be skipped. If the alert packet is skipped, rd_ptr[12:0] will be reloaded from eop_ptr_reg 143 to point to the beginning of the next alert packet. Otherwise, the current packet should be sent out, and rd_ptr[12:0] will be incremented by one to point to the first location of the packet data. The packet data will be transmitted out one word at a time until rd_ptr[12:0] reaches eop_ptr[12:0] (block 107). After the current alert packet is completely transmitted out, if transmitting three times is specified (block 188), sendCnt[1:0] will be decremented by one in the decrement send count state 184. If sendCnt[1:0] has not reached to zero (block 189), rd_ptrt[12:0] will be reloaded from sop_ptr register 145 [12:0] to retransmit the same alert packet. In case sendCnt[1:0] has decremented to zero (which indicates the same alert packet has been transmitted three times in block 189) or three time repetition mode is not specified in block 188, lastPkt indication will be checked (block 190). If it is not the last packet, the process returns to the read FSH state 181, and subsequent alert packets will be scanned to determine whether they should be transmitted or skipped. Otherwise, the scan control logic will go back to idle state 180, waiting for the next scan interval to come.

Figure 6:
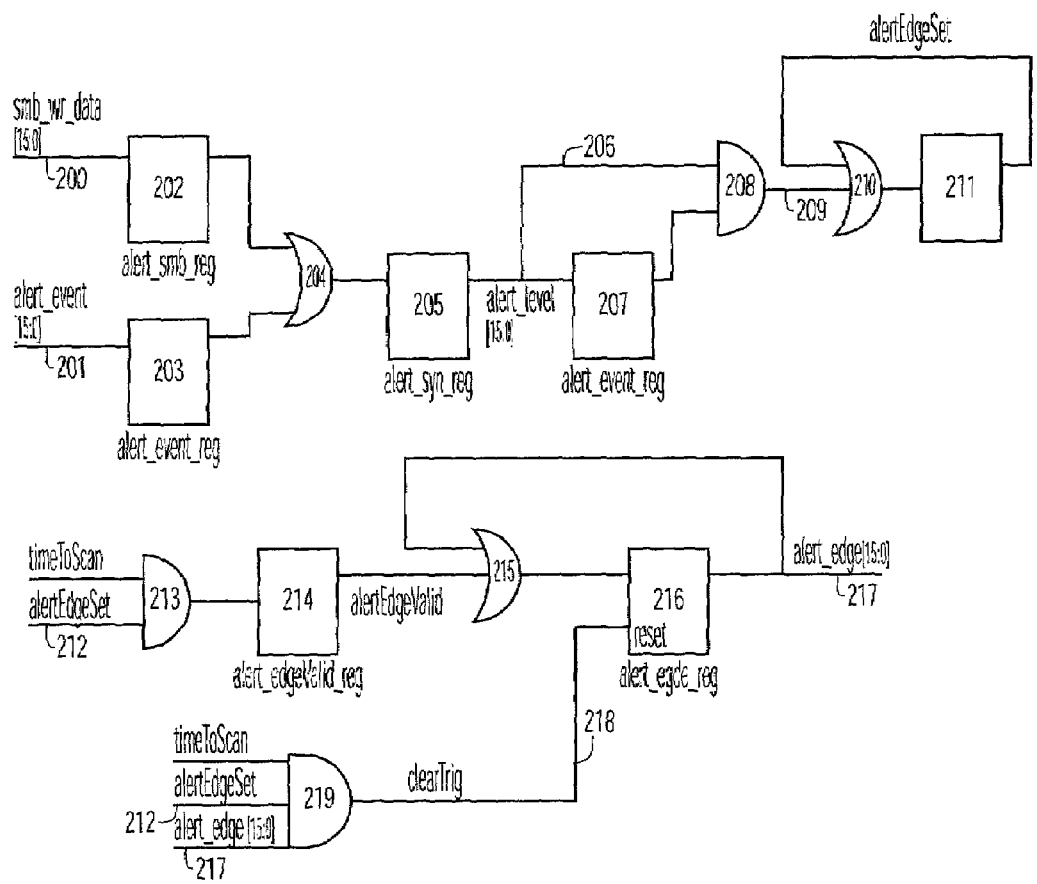
FIG. 6 is a logic diagram for alert level and alert edge detection in support of the alert signal interface and scan logic of FIG. 4.

The alert edge/level generator 129 of FIG. 4 is shown in more detail in FIG. 6. Inputs to logic include the SMBus write data on line 200, and the alert event signals on line 201. The SMBus write data on line 200 is applied to alert SMB register 202. The alert event signals on line 201 are supplied to an alert event register 203. The outputs of the alert SMB register 202 and the alert event register 203 are supplied through OR gate 204 as input to the alert synchronization register 205. The output of the alert synchronization register 205 is an alert level signal on line 206. The alert level signal on line 206 is supplied as input to alert event register 207. The output of the alert event register 207 and the alert level signal on line 206 are supplied through AND gate 208 to produce an alert edge pulse on line 209. The signal on line 209 is applied to an OR gate 210 to an alert edge set register 211. The output of the alert edge set register 211 is provided as feedback as input to the OR gate 210.

The alert edge set signal is applied on line 212 along with the time to scan signal from the scan timer as inputs to AND gate 213. The output of the AND gate 213 is supplied to an alert edge valid register 214. The alert edge valid signal from the register 214 is applied through OR gate 215 to an alert edge register 216. The alert edge register 216 supplies output on line 217 which is applied as feedback OR gate 215. The alert edge register 216 is reset response to a clear trigger on line 218. The clear trigger is generated by the AND gate 219 which receives the time to scan signal, the alert edge set signal on line 212, and the alert edge signal on line 217 as inputs.

The generator 129 is used to generate the alert_edge signal on line 217 (for one time or three times alert packets transmission) and the alert_level signal on line 206 (for sending out alert packets indefinitely until the alert_level signal is cleared). The source of alert condition can be either from external alert events or from Serial SMBus writing to alert register. The alert_level signal is a synchronized version of the alert condition which will stay active as long as alert condition is asserted. The alert_level signal is used to send out alert packets indefinately, such that each alert packet is sent out once per scan interval (or other periodic or non-periodic interval) as long as the alert_level signal is active. The alert_edge signal is detected through the assertion of the alert conditions and will be asserted at the beginning of scan interval and stays active until the beginning of next scan interval. Since the alert_edge signal will be active for the whole scan interval, it can be used to send out an alert packet al repetition number of times, such as one time or three times, in response to a match within one scan interval, even if alert conditions stay for multiple scan intervals.

Figure 7:
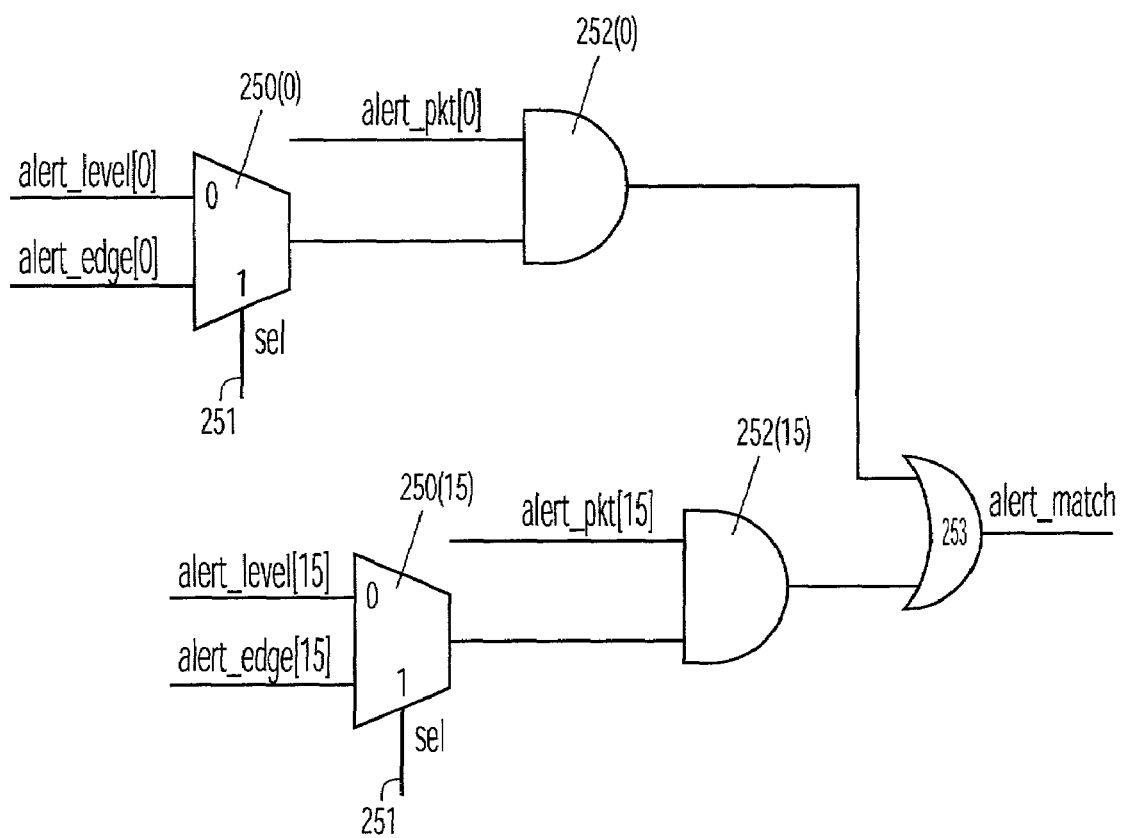
FIG. 7 is a logic diagram for alert match logic in support of the alert signal interface and scan logic of FIG. 4.

FIG. 7 shows the alert match logic 132 of FIG. 4 in more detail. For each bit in the alert level register and the alert edge register, a multiplexer 250(n) is provided. The multiplexer selects either the alert level bit or the alert edge bit response to a select signal 251. The outputs of the multiplexers are supplied with a corresponding bit from the alert_pkt field in the frame start header as inputs to respective AND gates 252(n). The outputs of AND gates 252(n) are supplied as inputs to OR gate 253. The output of OR gate 253 is the alert match signal on line 254.

Alert natch on line 254 is used to compare each alert_pkt bit in frame start header with either alert_level or alert edge from alert edge/level generator. If there is a match found, the alert_match signal will be generated which can be used by scan control logic 134 to determine whether the corresponding alert packet which is stored in buffer 120 should be sent out or skipped.

Figure 8:
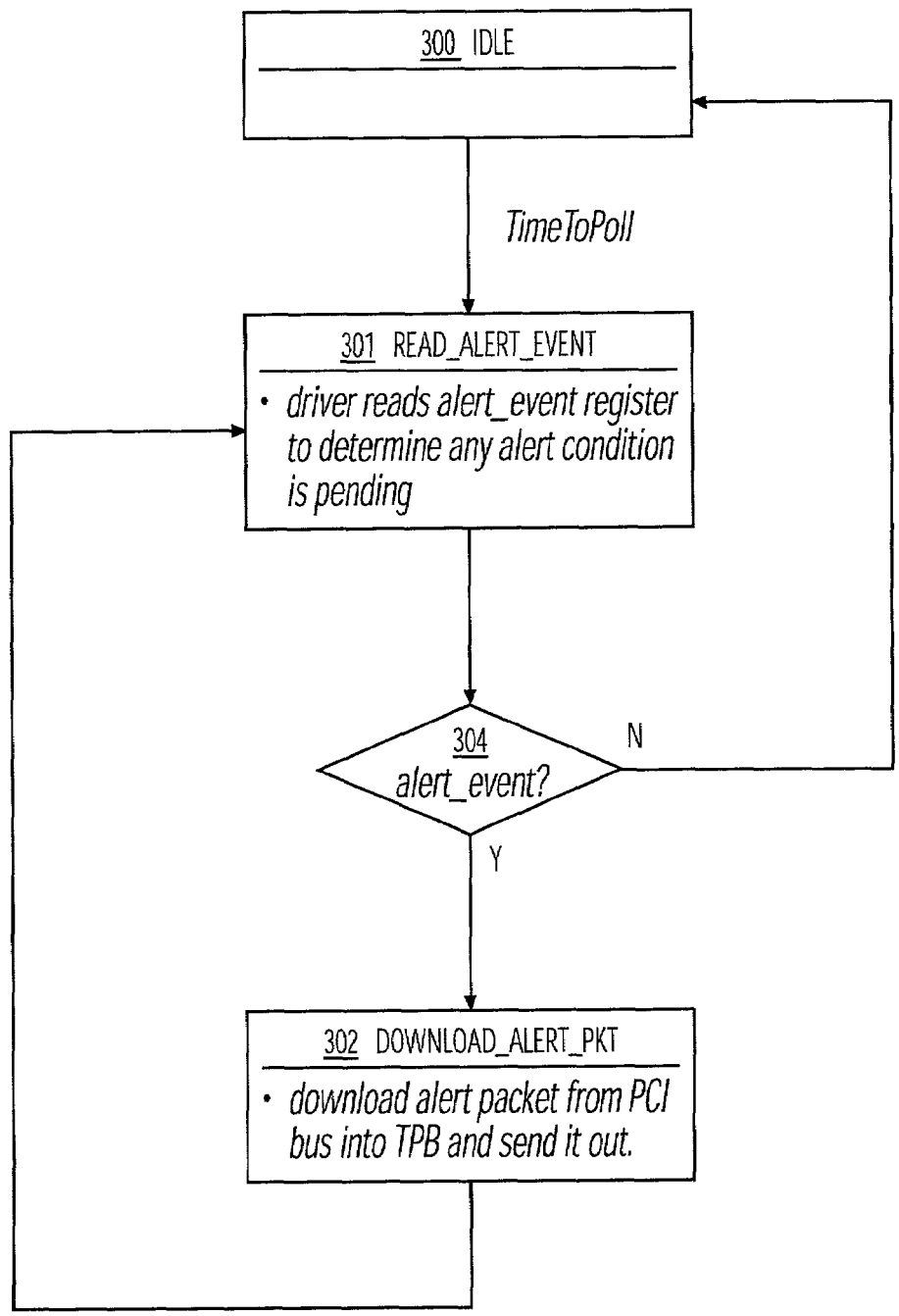
FIG. 8 is a flow diagram for alert generation when the operating system of the host processor is in an active state.

FIG. 8 shows alert generation in an OS-present state. The process includes an idle state 300, a read alert packet state 301, and a download alert packet state 302. In an OS-present state, system is running and software will periodically poll the alert_event register (e.g. register 207 of FIG. 6) to check whether any external alert event is occurring. Thus, upon a time to poll signal, the process moves from the idle state 300 to the read alert event state 301. Upon detecting any alert event (block 304), the process moves to the download alert event state 302, where a driver will download the corresponding alert packet from host memory through the PCI Bus to the transmit packet buffer and send it out. The process returns to the read alert event state 301, and will continue until all the pending alert events are serviced, or no alert event is detected in block 304. If no alert event is detected in block 304, the process moves to the idle state.

According to the present invention, a network interface is provided in which:

multiple alert packets can be stored into transmit packet buffer and each one can be sent out upon detecting the corresponding alert condition.

alert packets can be sent out while OS is present.

alert packets can be sent out while OS is absent.

alert packets can be sent out to remote management console only once.

alert packets can be sent out to remote management console three times to guarantee delivery.

alert packets can be sent out to remote management console indefinitely until the alert condition is cleared.

alert packets are sent out one time or three times through edge detect of the external alert conditions.

alert packets are sent out indefinitely through level detect of the external alert condition.

if there are no external pins available to detect alert conditions, an alert register can be programmed through a serial bus to flag alert conditions and the corresponding alert packets can be sent out accordingly.

multiple alert messages can be sent out corresponding to one alert condition.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A data processing system, comprising:
a host processor;
a network interlace coupled to the host processor, and including memory for storing a plurality of packets to be transmitted by the network interface; and
a system management system issuing alert signals in response to events;
wherein the network interface includes logic responsive to the alert signals to scan the plurality of packets stored in the memory at scan intervals, and transmit multiple different packets in the plurality of packets which include control codes matching a single alert signal during a given scan interval, one or more particular packets in the plurality of packets includes a control code indicating a repetition number for the particular packet, and wherein the logic is responsive to said repetition number to transmit the particular packet the repetition number of times in response to matching the alert signal during the given scan interval.

2. A data processing system, comprising:
a host processor;
a network interface coupled to the bust processor, and including memory for storing a plurality of packets to be transmitted by the network interlace; and
a system management system issuing alert signals in response to events;

wherein the network interface includes logic responsive to the alert signals to scan the plurality of packets stored in the memory at scan intervals, and transmit packets in the plurality of packets which include control codes matching an alert signal during a particular scan interval, and wherein at least one particular packet in the plurality of packets includes a control code indicating a repetition number for the particular packet, and the logic is responsive to said repetition number to transmit the particular packet the repetition number of times in response to matching the alert signal during the particular scan interval.

3. The data processing system of claim 2, wherein the packets include a field for control codes, and the logic reads the field for each packet in the plurality of packets during a given scan interval.

4. The data processing system of claim 2, wherein the system management system includes a system management bus coupled to the network interface, and said alert signals comprise data transmitted on the system management bus.

5. The data processing system or claim 4, wherein the system management bus comprises a serial bus, and the network interface includes a serial bus interface.

6. The data processing system of claim 2, wherein said network interlace comprises an integrated circuit including signal pins, and the system management system is coupled to the signal pins on the integrated circuit.

7. The data processing system of claim 2, wherein said network interface comprises an integrated circuit including a serial bus interface, dedicated signal pins, and alert signal input logic coupled to the dedicated signal pins and the serial bus interface accepting alert signals from one or both of the serial bus interface and the dedicated signal pins.

8. The data processing system of claim 2, wherein the alert signals issued by the system management system include signals indicating system and power management related events.

9. The data processing system of claim 2, wherein said host processor includes resources entering a first state in which an operating system is active and a second state in which the operating system is inactive, and which store the plurality of packets in the network interface in connection with a transition from the first state to the second state.

10. The data processing system of claim 2, wherein said host processor includes resources entering a first state in which an operating system is active and a second state in which the operating system is inactive, and in which said logic in the network interface operates during the second state.

11. The data processing system of claim 2, wherein said network interface includes an alert register storing alert signals, and said host processor includes resources entering a first state in which an operating system is active and a second state in which the operating system is inactive, and in which said logic in the network interface operates during the second state, and in which said host processor polls said alert register during the first state.

12. The data processing system of claim 2, wherein said logic includes circuits indicating an alert edge indicating timing of receipt of an alert signal, and circuits indicating an alert level indicating whether an alert signal is being asserted or not.

13. In a data processing system in which alert signals are generated in response to events, and including a network interface, a method comprising:

storing a plurality of packets in the network interface;

scanning the plurality of packets in scan intervals to identify packets having control codes matching alert signals received by the network interface so that more than one packet nay be identified in a particular scan interval; and transmitting the identified packets;

wherein the plurality of packets comprise control fields having data indicating a reception count for the packet, and said transmitting includes repeating transmission of the identified packets a number of times equal to the repetition count in response to a match during the particular scan interval.

14. In a data processing system in which alert signals are generated in response to events, and including a network interface, a method comprising:

storing a plurality or packets in the network interface, wherein the plurality of packets comprise control fields having data indicating a repetition mode for at least one of the plurality of packets;

scanning the plurality of packets in scan intervals to identify packets having control codes matching alert signals received by the network interface; and transmitting at least one identified packet according to the repetition model;

the indicated repetition mode provides for repeated transmission a number of times equal to repetition count in response to matching an alert signal in a particular scan interval.

15. The method of claim 14, wherein the indicated repetition mode provides for repeated transmission an indefinite number of times until an alert signal is cleared.

16. In a data processing system in which alert signals are generated in response to events, and including a network interface, a method comprising:

storing a plurality of packets in the network interface, wherein the plurality of packets comprise control fields having data indicating a repetition mode for at least one of the plurality of packets;

scanning the plurality or packets in scan intervals to identify packets having control codes matching alert signals received by the network interface; and transmitting at least one identified packet according to the repetition mode;

wherein the control fields include data indicating one of a plurality of repetition modes, including a first repetition mode providing for repeated transmission a number or times equal to a repetition count in response to matching an alert signal in a particular scan interval, and a second repetition mode providing for repeated transmission an indefinite number of times until an alert signal is cleared.

17. In a data processing system in which alert signals are generated in response to events, and including a network interface, a method comprising:

storing a plurality of packets in the network interface, wherein the plurality of packets comprise control fields having data indicating a repetition mode for at least one of the plurality of packets;

scanning the plurality of packets in scan intervals to identify packets having control codes matching alert signals received by the network interface, and transmitting at least one identified packet according to the repetition mode;

wherein the control fields include data indicating one of a plurality of repetition modes, including a first repetition mode providing for repeated transmission a number of times equal to a repetition count greater than one in response to matching an alert signal in a particular scan interval, a second repetition mode providing for transmission once in response to matching an alert signal, and a third repetition mode providing for repeated transmission an indefinite number of times until an alert signal is cleared.

18. The method of claim 14, wherein the plurality of packets comprise control fields, and including indicating an alert edge upon receipt of an alert signal, and indicating an alert level signaling whether an alert signal is being asserted or not; and wherein said transmitting includes transmitting in response to an alert edge or in response to an alert level based upon data in the control fields.

19. In a data processing system in which alert signals are generated in response to events, and including a network interface, a method comprising:

storing a plurality of packets in the network interface, wherein the plurality of packets comprise control fields having data indicating a repetition mode for at least one of the plurality of packets;

scanning the plurality of packets in scan intervals to identify packets having control codes matching alert signals received by the network interface;

transmitting at least one identified packet according to the repetition mode;

indicating an alert edge upon receipt of an alert signal, and indicating an alert level signaling whether an alert signal is being asserted or not; and wherein the control fields include data indicating one of a plurality or repetition modes including a first repetition mode providing for repeated transmission a number or times equal to repetition count in response to matching an alert signal on an alert edge, a second repetition mode providing for repeated transmission an indefinite number of times in response to matching on an alert level.

* * * * *